Jan. 9, 1934.   E. R. TAYLOR ET AL   1,942,848
METHOD FOR LEACHING FILM, ETC
Filed May 24, 1930
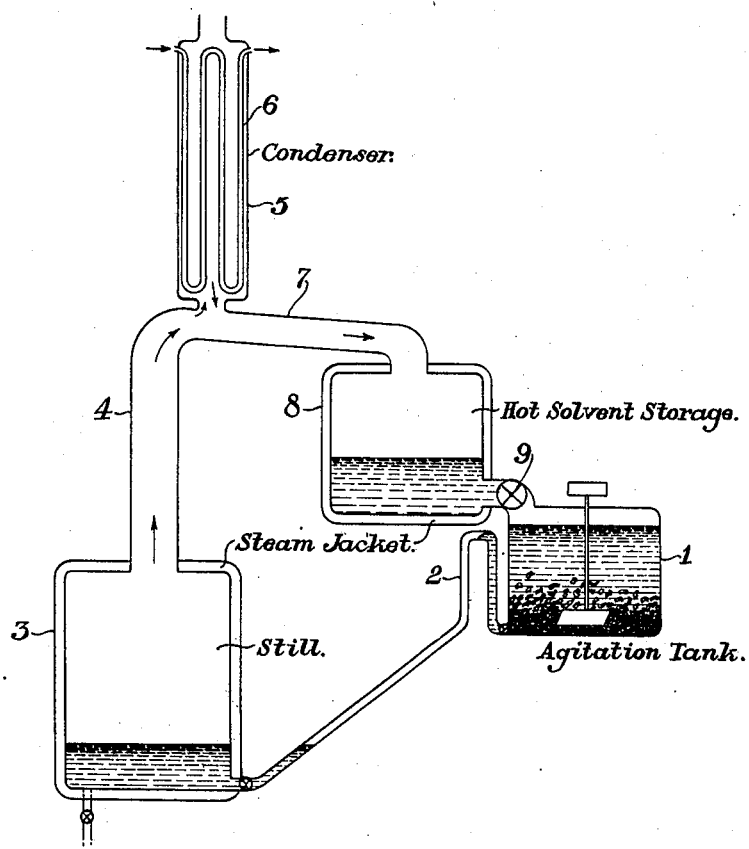
Ernest R. Taylor & Charles E. Allen,
Inventors Patented Jan. 9, 1934

1,942,848

UNITED STATES PATENT OFFICE 1,942,848

METHOD FOR LEACHING FILM, ETC.

Ernest R. Taylor and Charles E. Allen, Rochester, N. Y., assignors to Eastman Kodak Company, Rochester, N. Y., a corporation of New York Application May 24, 1930. Serial No. 455,446

2 Claims. (Cl. 252—1)

This invention relates to a method and apparatus for reclaiming dyed film scrap, artificial silk waste, etc., and more particularly relates to a method and apparatus, whereby film scrap and the like having a base or support of either cellulose nitrate or cellulose acetate may be leached with hot alcohol.

Various attempts have been made to leach color from dyed film scrap by the use of alcohol or combinations thereof. These have met with varied degrees of success but are not as efficient with respect to certain types of film scrap as may be desired.

We have found that certain types of dyed film scrap can be successfully leached of the dye contained therein by the use of hot ethyl alcohol in a novel manner, provided the application of the hot ethyl alcohol to the film scrap can be made intermittent with removal of the dye from the alcohol during such intermittent application of the alcohol. This intermittent application is sometimes important for the reason that in the case of some dyes, the dye may be caused to penetrate even deeper into the film if the alcohol is permitted to become too saturated with the dye or to remain in contact with the film too long while containing large percentages of dye.

It is, therefore, among the objects of our invention to provide an apparatus and method whereby dyed cellulose derivative scrap may be reclaimed and more particularly may be so treated as to remove the dye therefrom. It is a further object to provide a continuous method operating substantially automatically to intermittently subject the cellulosic material to the recovery treatment and to provide an apparatus suitable for carrying this method out. Other objects will be apparent herein.

In the accompanying drawing containing a single figure and forming a part hereof and in which like reference characters refer to like parts, the film scrap to be reclaimed is, after the silver halide emulsion has been removed therefrom, placed in a container 1 which is provided with one or more convenient openings for loading and unloading the film scrap. This container is connected near the bottom thereof by a siphon 2 with a steam heated or jacketed still 3 provided with a drain pipe controlled by a suitable valve. The still 3 contains alcohol which is distilled over through the line 4 into the water cooled condenser 5 in which the alcohol condenses and trickles down into the sloping line 7. Assuming the still 3 to be heated and to contain a suitable quantity of ethyl alcohol, the alcohol is vaporized and condensed in the condenser 5. The passage of the cooling water through the cooling coil 6 is so controlled that the alcohol, though condensed, passes into the line 7 at a temperature of approximately 60° to 70° C. The condensed hot alcohol passes along the line 7 into the hot storage tank 8 where a reserve of the fresh alcohol is maintained at about 60° to 70° C. Assuming the container 1 to contain a suitable quantity of film scrap base to be treated, a controlled flow of alcohol is permitted to trickle over the film scrap, the flow being controlled by a suitable valve 9. When sufficient alcohol has thus been supplied to the container 1, namely, so that the container is filled to a point slightly above the upper portion of the siphon neck 2, as shown in the drawing, the siphon begins to act and since it is provided with greater capacity than the rate at which the alcohol is supplied to the container 1, it rapidly empties the container 1 of the alcohol so that the alcohol is rapidly drained from the film and conducted back to the still 3 for redistillation. The siphon is provided at each end with a valve for convenience in shutting it off in case of repairs, etc. to either the siphon, the still or the container. During operation these valves are open. The operation is, of course, so timed that the alcohol leaches from the film the maximum amount of dye which is efficient under this type of operation. The film scrap is constantly agitated by suitable means to give complete contact of the alcohol to all surfaces of the scrap. The alcohol is, of course, redistilled from the still 3 in substantially pure form, the dye remaining behind. The still 3 can be periodically emptied of the concentrated dye solution left therein and such disposal made thereof as desired. The film scrap is, of course, removed from the container 1 as soon as it has been completely leached of its dye.

It will be apparent to those skilled in the art that various modifications in both the method and apparaus may be employed without departing from the spirit of the invention or scope of the claims appended hereto. For instance, the hot solvent reservoir could be omitted provided the distillation and condensation of the alcohol be so controlled that the input of alcohol into the film container 1 is that desired. Also the siphon 2 may be replaced by ordinary valve controlled means for intermittently emptying the container 1 if desired. Also the dye laden alcohol need not be immediately redistilled nor does the distillate need pass immediately back into the container 1 or the reservoir 8 but it will be understood that the method shown by us is one of the most efficient. Other variations in the method and apparatus may be employed if desired, as well as in the materials treated as it will be apparent that the process and apparatus may be as effectively employed for leaching of dyed artificial silk waste and the like as for leaching film scrap it being merely necessary that the scrap be composed of cellulose acetate or nitrate or similar cellulose derivative.

What we claim as our invention and desire to be secured by Letters Patent of the United States is:

1. The method of leaching color from dyed cellulose derivative scrap which comprises agitating the scrap in a leaching bath, intermittently and rapidly draining the bath from the scrap, distilling the bath, condensing and returning the distillate to intermediate storage and immediately following the draining of the bath rapidly adding to the film a fresh batch of distilled leach and continuing that cycle of treatment with consequent intermittent draining and submerging of the scrap.

2. The method of leaching color from dyed cellulose derivative scrap which comprises agitating the scrap in a leaching bath, intermittently and rapidly draining the alcohol from the scrap, distilling the alcohol, condensing and returning the distillate to intermediate storage and immediately following the draining of the alcohol, rapidly adding to the film a fresh batch of distilled leach, and continuing that cycle of treatment with consequent intermittent draining and submerging of the scrap.

ERNEST R. TAYLOR.
CHARLES E. ALLEN.